(12) United States Patent
Turner et al.

(10) Patent No.: US 6,543,817 B1
(45) Date of Patent: Apr. 8, 2003

(54) PROCESS FOR FORMING RADIALLY UPSET TUBE FLANGE AND TUBE CONNECTOR ASSEMBLY FORMED THEREBY

(75) Inventors: Laral E. Turner, Claypool, IN (US); Paul Scheuer, Warsaw, IN (US)

(73) Assignee: Whitley Products, Inc., Pierceton, IN (US)

( * ) Notice: Subject to any disclaimer, the term of this patent is extended or adjusted under 35 U.S.C. 154(b) by 0 days.

(21) Appl. No.: 09/628,914

(22) Filed: Jul. 31, 2000

(51) Int. Cl.[7] ............................................. F16L 19/028
(52) U.S. Cl. .................................... 285/353; 285/382.5
(58) Field of Search ............................. 285/344, 382.5, 285/331, 334.5; 29/512, 520, 522.1, 523

(56) References Cited

U.S. PATENT DOCUMENTS

| | | | | |
|---|---|---|---|---|
| 1,961,453 A | * | 6/1934 | Quarnstrom | 285/334.5 |
| 2,357,748 A | | 9/1944 | Lyon | 153/79 |
| 2,551,871 A | * | 5/1951 | Briggs, Jr. | 29/523 |
| 3,766,631 A | | 10/1973 | Scheitlin et al. | 29/424 |
| 3,778,090 A | * | 12/1973 | Tobin | 29/523 |
| 3,924,883 A | * | 12/1975 | Frank | 285/256 |
| 3,938,240 A | | 2/1976 | Holden | 29/512 |
| 4,442,586 A | * | 4/1984 | Ridenour | 29/523 |
| 4,832,377 A | * | 5/1989 | Umehara | 29/523 |
| 5,131,145 A | | 7/1992 | Badoureaux | 29/890.144 |
| 5,141,262 A | | 8/1992 | Bartholomew | 285/187 |
| 5,263,238 A | * | 11/1993 | Cooper | 29/512 |
| 5,607,194 A | * | 3/1997 | Ridenour | 285/334.5 |
| 5,626,808 A | * | 5/1997 | Miyajima | 29/523 |
| 5,651,173 A | | 7/1997 | Roy et al. | 29/512 |
| 5,658,025 A | | 8/1997 | Ridenour | 285/334.5 |
| 6,328,073 B1 | * | 12/2001 | Slais | 29/523 |

FOREIGN PATENT DOCUMENTS

| | | | | |
|---|---|---|---|---|
| DE | 159857 | | 6/1940 | |
| GB | 428636 | | 5/1935 | |
| GB | 1 429 566 | | 3/1976 | ........... F16L/41/00 |

* cited by examiner

Primary Examiner—F. Vanaman
(74) Attorney, Agent, or Firm—Taylor & Aust, P.C.

(57) ABSTRACT

A process for forming a radially upset tube flange particularly suitable for securing a connector on an end of a tube, and a connector assembly formed thereby. A connector is provided, having an end face and an away face. A desired length of tube is provided, having an end portion and a tube end. The connector is passed over the end portion of the tube, with the end face of the connector nearest the tube end and the away face of the connector farthest from the tube end. The tube is gripped with a fixture, and positioned with the away face of the connector against the fixture. A preferred length of the tube end portion extends axially beyond the end face of the connector. Force is applied axially to the tube end, causing a major radially outward upset of the tube against the end face of the connector and a minor radially outward upset of the tube against the away face of the connector. A tapered punch is forced into the tube end axially, causing the tube end to flare outwardly.

3 Claims, 2 Drawing Sheets

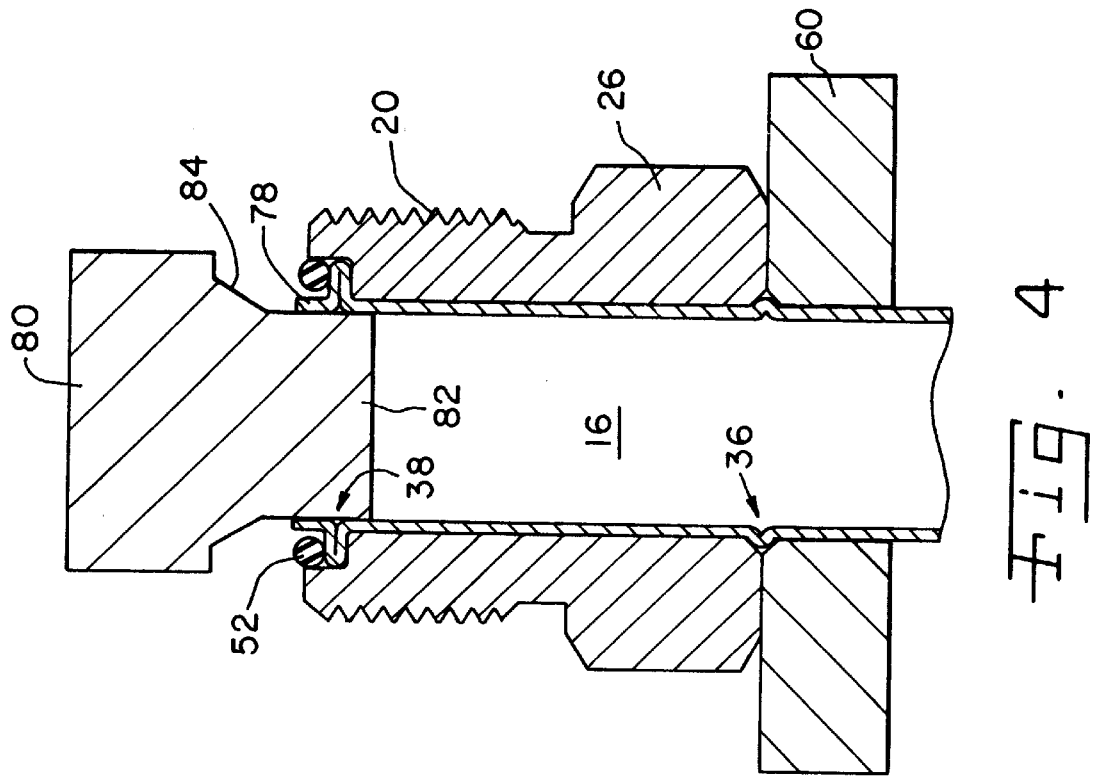
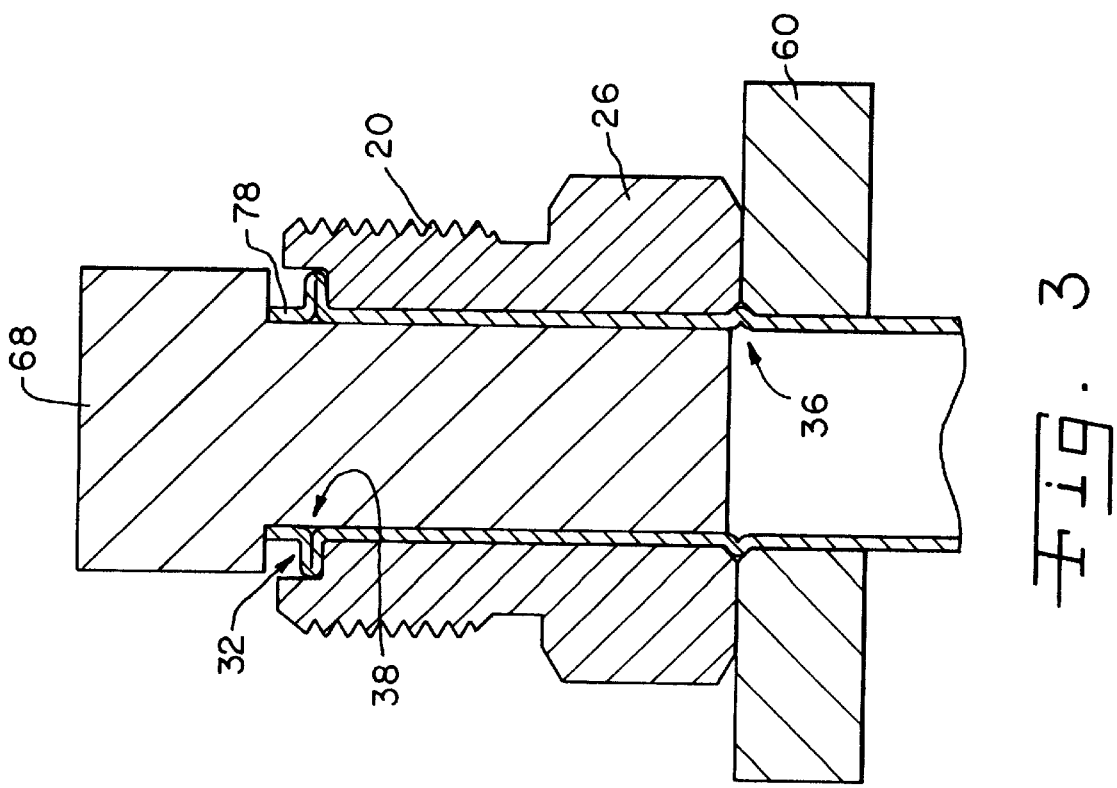

PROCESS FOR FORMING RADIALLY UPSET TUBE FLANGE AND TUBE CONNECTOR ASSEMBLY FORMED THEREBY

BACKGROUND OF THE INVENTION

1. Field of the Invention

The present invention relates generally to methods for providing connector assemblies on tube ends, and, more particularly, to a process for forming radially upset flanges to secure a connector on the end of a tube, and to a connector assembly formed by the process.

2. Description of the Related Art

It is known in fluid transportation systems utilizing tubes of steel, copper or other metals to form a connector assembly on the end of the tube, for connecting the tube to another component of the fluid system, or to a complementary connector assembly on another tube section. A connector assembly includes a tube and a connector provided on the tube at an end portion of the tube. The connector may take the form of a nut, a female connector of another design, or a male connector of suitable form and function. It is also known, when coupling together connector assemblies of adjacent fluid system components, to provide a sealing member associated with the connectors, to create a fluid tight seal. It may be required that the connector be permitted to rotate on the tube end, to establish the connection between the connectors, but the connection must be tight i.e., not permitting fluid to leak from the connector assembly. For a proper, fluid tight engagement between the connectors, any sealing member used must be properly positioned.

It is desirable to have the sealing member maintained in proper position by the structure of the connector assembly itself, to minimize the possibility that the sealing member would become mispositioned. It is also desirable that the connector assembly is axially secured near the end of the tube, that is the connector is restricted from moving significantly in either direction axially on the tube.

It also is known to provide a flared end on a tube, to provide a sealing surface against which the tube can be mated to another tube or system component. The flared end may also be used to prevent the connector from passing off the end of the tube. However, it is preferred that axial movement of the connector be inhibited by other than the flared end, as distortion of the flared end may result in fluid leakage at the connection. For this reason, radially outward upsets of the tube have been used to secure the position of the connector on the tube. Creating the radially outward upsets has been neither easy nor simple, often requiring multiple steps, increasing manufacturing expense.

What is needed is a simplified manufacturing process for securing a connector at the end of a tube. What is further needed is a tube and connector assembly which can be manufactured in a simple and efficient manner, and which incorporates the desirable features for such an assembly, including restraining the connector against axial movement on the tube and providing a sealing flange and a properly positioned sealing member for creating a fluid tight seal.

SUMMARY OF THE INVENTION

The present invention provides a process for forming radially outward upsets, or deformations, in tubes, in a simplified sequence of steps, and further provides a tube connector assembly formed by the process. Radially outward upsets can be formed substantially simultaneously at opposite ends of a connector positioned on the tube, and a sealing member can be secured in place on the tube while forming a flared end on the tube.

The invention comprises, in one form thereof, a method of securing a connector on an end of a tube. A connector is provided, having an end face and an away face. A desired length of tube is provided, having an end portion and a tube end. The connector is passed over the end portion of the tube, with the end face of the connector nearest the tube end and the away face of the connector farthest from the tube end. The tube is gripped with a fixture, and positioned with the away face of the connector against the fixture. A preferred length of the tube end portion extends axially beyond the end face of the connector. The end of the tube is impacted axially, causing a major radially outward upset of the tube against the end face of the connector and a minor radially outward upset of the tube against the away face of the connector. A tapered punch is forced into the tube axially, at the tube end, causing the end of the tube to flare outwardly. The tube is released from the fixture.

The invention comprises, in another form thereof, a tube end connector assembly. A length of tube has a tube end portion, a tube end and a tube axis. A connector is disposed on the tube end portion, the connector having an end face nearest the tube end and an away face. A major radially outward upset of the tube is disposed against the connector end face, and a minor radially outward upset of the tube is disposed against the connector away face.

The invention comprises, in yet another form thereof, a process for forming a flanged tube. A section of tube is provided, having a tube end. The tube is secured against axial movement by grasping the tube in a fixture. External support of the tube is provided along regions of the tube between the tube end and the fixture where a radially outward flange is not desired. Regions without external support are provided between the tube end and the fixture where a radially outward flange is desired. An axial force is applied to the tube end, causing portions of the tube to buckle outwardly at the regions without external support.

An advantage of the present invention is that a simplified manufacturing process is provided for securing a connector on a tube.

Another advantage of the present invention is in providing a tube end connector assembly which can be manufactured efficiently, having a connector secured near the end of the tube, with the connector restrained from axial movement along the tube.

Yet another advantage of the present invention is that a simplified manufacturing process is provided for forming flanged tubes with flanges in a plurality of discrete locations along the tube length.

BRIEF DESCRIPTION OF THE DRAWINGS

The above-mentioned and other features and advantages of this invention, and the manner of attaining them, will become more apparent and the invention will be better understood by reference to the following description of (an) embodiment(s) of the invention taken in conjunction with the accompanying drawing(s), wherein:

FIG. 3 is a cross-sectional view similar to that of FIG. 2, but showing a later stage in the process for manufacturing the tube connector assembly shown in FIG. 1; and FIG. 4 is a cross-sectional view similar to that of FIG. 3, but showing a final stage in the process for manufacturing the tube connector assembly shown in FIG. 1.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
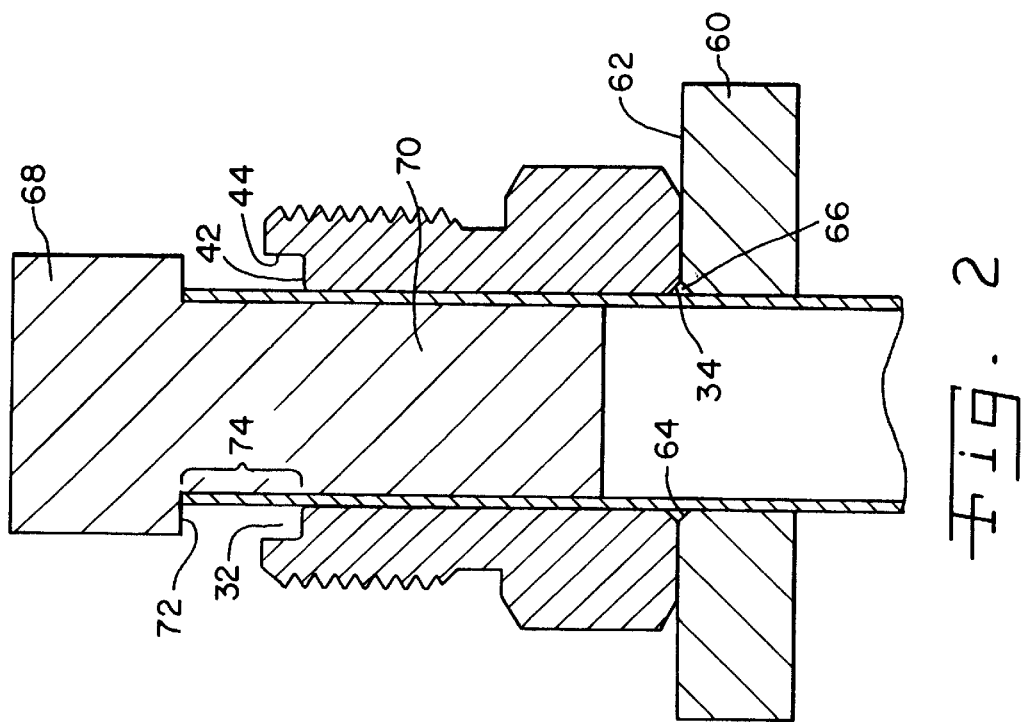
FIG. 1 is a cross-sectional view of a tube connector assembly of the present invention.

Referring now to the drawings, and more particularly to FIG. 1, there is shown a tube end connector assembly 10 according to the present invention and manufactured in accordance with the process of the present invention.

Tube end connector assembly 10 includes a tube 12 and a connector 14 secured on tube 12 at an end portion 16 of tube 12. Tube 12 and connector 14 may be of metal such as steel, copper or the like, the material for tube 12 and connector 14 being selected based on the properties necessary for the fluid transportation system in which they will be utilized. The size, shape and structure for tube 12 and connector 14 are also selected based on the requirements of the fluid transportation system in which they will be used.

End portion 16 of tube 12 includes a tube end 18. Tube 12 may include a connector 14 at each end thereof; however, only one such tube end portion 16 and connector 14 are shown in FIG. 1.

Connector 14 is shown as a male connector having threads 20 for engagement with complimentary threads of a female connecting member (not shown) which may be provided on another section of tube to which tube 12 is to be connected, or on another component in the fluid transportation system in which tube 12 is used. Connector 14, as shown in the drawings, is merely one suitable type of connector which may be part of tube end connector assembly 10, and it should be readily understood that female connectors may be part of a tube end connector assembly 10 in accordance with the present invention, as may be other types of connectors including spring loaded snap type connectors as well as screw connectors of other types. As used herein, the term connector shall mean any suitable male or female component, or any other device that may be fastened to a tube, and is useful for securing a tube to another tube or to a system component in a fluid transportation system.

Connector 14 includes a central bore 22 of slightly greater diameter than the outer diameter of tube 12, thus allowing connector 14 to slide over end portion 16 of tube 12. It will be understood by those skilled in the art that it may be necessary, depending on the type of connector 14 being used, for connector 14 to rotate about an axis 24 of tube 12. Rotation of connector 14 may be generated through a head 26, which may be shaped for engagement by a wrench or the like. Head 26 may also include a knurled outer body surface (not shown), when connector 14 is to be rotated by hand. Connector 14 includes a connector end face 28 and a connector away face 30, each the end face 28 and away face 30 being generally orthogonal to tube axis 24. As positioned on tube 12, connector end face 28 is that end of connector 14 nearest tube end 18, and away face 30 is that end of connector 14 furthest from tube end 18.

At the juncture between connector end face 28 and connector central bore 22, a major recess 32 defines a pocket formed as a cutback from each end face 28 and central bore 22. While shown as a general parallel cutbacks from each end face 28 and central bore 22, it should be recognized that major recess 32 need not be a right angle pocket as shown in FIG. 1 but may include other shapes as well. Major recess 32 is a recessed segment of end face 28 as well as a recessed segment of central bore 22, and references herein to end face 28 and central bore 22 shall be understood to include major recess 32.

At the opposite end of connector 14 from major recess 32, a minor recess 34 is formed in the juncture between away face 30 and central bore 22. Minor recess 34 is a cutback from each away face 30 and central bore 22, and as shown in FIG. 1, minor recess 34 is a tapered segment of away face 30 at the juncture between away face 30 and central bore 22. Again, it will recognized by those skilled in the art that the shape of minor recess 34 may be other than as shown in the drawings. Minor recess 34 is a recessed segment of each away face 30 and central bore 22, and references herein to away face 30 and central bore 22 shall be understood to include minor recess 34.

End portion 16 of tube 12 includes a minor radially outward upset 36 which is disposed substantially in minor recess 34 of connector 14. Minor radially outward upset 36 is a bump, ridge or minor outward protrusion of tube 12. Tube 12 further includes a major radially outward upset 38 disposed in major recess 32 of connector 14. Major radially outward upset 38 is a more pronounced outward upset than is minor radially outward upset 36, and in the embodiment shown in FIG. 1, major radially outward upset 38 is a folded segment 40 of tube 12.

It should be understood that major radially outward upset 38 and minor radially outward upset 36, while shown to be significantly different in size, may also be of similar size and shape. However, the function of minor radially outward upset 36 is primarily to restrain connector 14 from sliding on tube 12, away from tube end 18. Therefore, a small protrusion in tube 12 is sufficient, as minimal force will be exerted on minor radially outward upset 36 in normal use. On the other hand, major radially outward upset 38 becomes a bearing surface against which connector 14 exerts force when a connection is made to a complimentary fitting of another tube or component of the fluid transportation system. Major recess 32 advantageously includes a floor 42 and a side wall 44 defining the recess. Folded segment 40 of tube 12 has a double layer of tube wall, including a lower segment 46 and an upper segment 48 which rest on floor 42 of major recess 32. Significant loading force can be applied by floor 42 to folded segment 40, in drawing tube end 18 toward and against a component to which it is connected, to create a fluid tight connection.

At a minimal axial length from tube end 18, a flared portion 50 is provided. A sealing member, such as an o-ring 52, is provided also generally disposed in major recess 32. O-ring 52 is wedged between wall 44 of major recess 32 and tube end 18 at outwardly flared portion 50. O-ring 52 is thereby retained in position by wall 44 and flared portion 50, and o-ring 52 generally rests on folded segment 40 and particularly on upper segment 48 of folded segment 40. O-ring 52 projects slightly beyond tube end 18 and connector end face 28, in an axial direction relative to tube 12.

Figure 2:
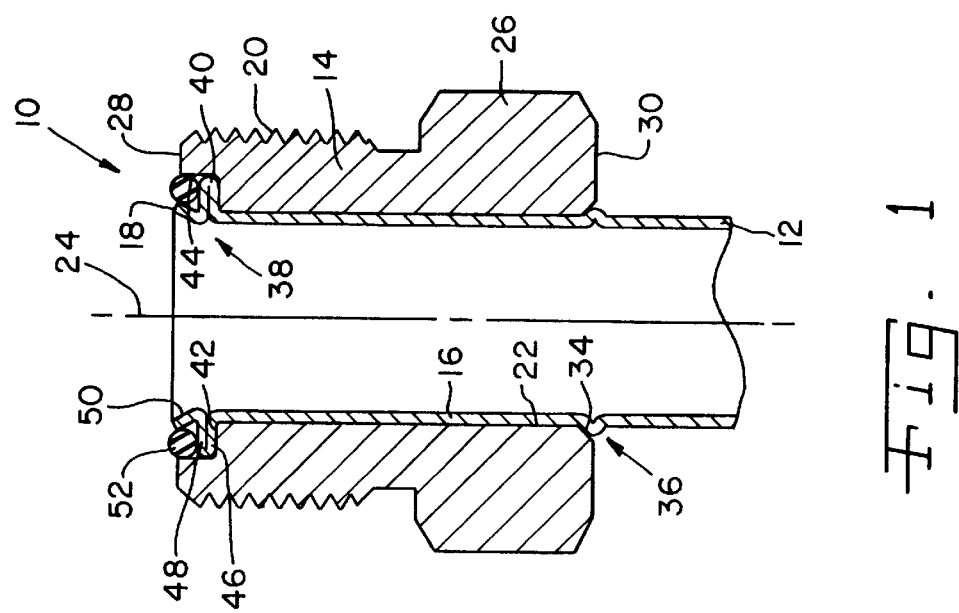
FIG. 2 is a cross-sectional view similar to that of FIG. 1, but showing an early stage in the process for manufacturing the tube connector assembly shown in FIG. 1.

FIGS. 2, 3 and 4 illustrate steps in a process for forming tube end connector assembly 10. Referring first to FIG. 2, an early stage in the manufacturing process is illustrated. Tube 12 is a cylindrical body with an essentially smooth outer surface having no significant dimples or outward projections or flanges along end portion 16. A desired length of tube 12 is clamped in a fixture 60, which may be a multi-piece device encircling tube 12 and clamping the tube therein, restricting axial movement of the tube. Connector 14 is slid over end portion 16 of tube 12, and away face 30 of connector 14 rests against an upper face 62 of fixture 60.

Upper face 62 includes a tapered surface 64 extending downwardly and inwardly from upper face 62 of fixture 60. The inner edge of tapered surface 64 extends to the outer surface of tube 12, and tapered surface 64 together with minor recess 32 defines a cavity 66.

A punch 68 includes a probe portion 70 which can slide into tube 12. A shoulder 72 extends radially outwardly from probe portion 70 and extends beyond the outer surface of tube 12. Through shoulder 72, punch 68 applies force axially to tube end 18, compressing tube end portion 16 between tube end 18 and fixture 60. While an abrupt force may be applied to tube end 18, such as by an impact, force also may be applied as a progressive compressive force. As shown in FIG. 3, as axial force is applied to tube end 18, the tube bends radially outwardly, in regions between fixture 60 and tube end 18 whereat no external support of the tube is provided. Connector 14 provides external support of the tube between major recess 32 and minor recess 34, preventing outward deformation therealong. Inward deformation of tube 12 is inhibited by the hoop strength of tube 12, and may be further inhibited through internal support provided by probe portion 70, which may extend within tube 12 beyond fixture 60.

In a single operation, minor radially outward upset 36 is formed in cavity 66 and major radially outward upset 38 is formed in major recess 32. Shoulder 72 may include a portion providing external support of the tube for a minimal distance inwardly from tube end 18. Support in such manner could be created by providing in shoulder 72 a groove (not shown) having a depth substantially equal to the length of tube to remain between folded segment 40 and tube end 18. Punch 68 thereby can provide both internal support and external support for a region of tube end portion 16. The portion of shoulder 72 radially outward from such a groove could be used for tamping down or compressing folded segment 40 if required; however, in many applications it is not believed that such will be necessary.

As shown in FIG. 2, a preferred length 74 of tube end portion 16 extends beyond connector 14 when tube 12 is secured in fixture 60, and connector 14 is positioned thereon. The dimension of preferred length 74 is such as to provide sufficient tube material to form folded segment 40 and flared portion 50.

When axial impacting of tube end 18 is complete, and minor radially outward upset 36 and major radially outward upset 38 have been formed, punch 68 is withdrawn from tube 12. A sealing member such as o-ring 52 is placed around tube 14, in major recess 32, essentially resting upon folded segment 40, and particularly upper segment 48 thereof, between an end most portion 78 of tube 14 and wall 44 of major recess 32. A tapered punch 80 is inserted into tube end 18, and has a probe portion 82 similar to but perhaps shorter than probe portion 70 of punch 68. A tapered face 84 extends outwardly from probe portion 82, and, as tapered punch 80 is forced into tube end 18, tapered face 84 urges end most portion 78 outwardly, thereby forming flared portion 50 of the completed assembly. Outward flaring of end most portion 78 creates a minimal clearance separation between tube end 18 and wall 44, trapping o-ring 52 in the position described.

Upon completion of forming flared portion 50, tapered punch 80 is removed from tube end 18. Tube 12 is released from fixture 60, and the process for forming tube end connector assembly 18 is essentially complete. The process may then be repeated on an opposite end of tube 12, to provide a connector assembly using a similar, complimentary or even different tube end connector 14. Under some circumstances, in some facilities, it may be possible to perform the process substantially simultaneously on both ends of a tube 12, thereby completing the formation of tube end connector assemblies 10 on both ends of tube 12 at the same time.

The present invention provides a simplified process in which a connector can be attached at an end portion of a tube and can be restrained against axial movement on the tube in either direction. Radially outward upsets of the tube can be formed by impacting the tube axially at the tube end, while restraining the tube in a fixture and providing external support of the tube in regions where radially outward upsets are not desired and providing no external support of the tube where radially outward upsets are desired. A manufacturing process and a structure are provided whereby an o-ring or other sealing member is retained at the end of a tube.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of securing a connector on an end of a tube comprising:

providing a connector having a bore, an end face and an away face;

providing a major recess in the connector formed as a pocket defined by a cut-back from each the end face and the central bore;

providing a minor recess in the connector formed by a cutback from each the away face and the central bore;

providing a desired length of tube having an end portion and a tube end;

passing the connector over the end portion of the tube, through the bore, with the end face of the connector nearest the tube end and the away face of the connector farthest from the tube end;

gripping the tube with a fixture and positioning the away face of the connector against the fixture, with a preferred length of the tube end portion extending axially beyond the end face of the connector;

applying force axially to the tube end, causing a major radially outward upset of the tube in the major recess of the connector and causing a minor radially outward upset of the tube in the minor recess of the connector;

forcing a tapered punch into the tube end axially, causing an end most portion of the tube to flare outwardly; and releasing the tube from the fixture.

2. The method of claim 1, including the steps of passing a sealing member over the tube end after said step of applying force axially to the tube end and prior to said step of forcing a tapered punch into the tube end, and positioning the sealing member against the major radially outward upset of the tube in the major recess.

3. The method of claim 2, further including a step of flaring the tube end most portion outwardly sufficiently to retain the sealing member between the tube end, the major radially outward upset of the tube and the cutback from the central bore.

* * * * *